INVENTOR
RUSSELL E. COOK
BY
ATTORNEYS

United States Patent Office 3,552,136
Patented Jan. 5, 1971

3,552,136
SAFETY CONTROL FOR WATER CHILLERS
Russell E. Cook, Columbus, Ohio, assignor to Ranco Incorporated, Columbus, Ohio, a corporation of Ohio
Filed Dec. 19, 1968, Ser. No. 785,090
Int. Cl. F25c 1/08
U.S. Cl. 62—139
8 Claims

ABSTRACT OF THE DISCLOSURE

A water chilling machine, having a water freezing unit in a chamber through which water to be chilled is circulated by a pump, is shut down to discontinue freezing unit operation when the pressure differential between the inlet and outlet of the pump is below a given degree, which may occur due to lack of water, clogging of water conduits, etc., and also when that differential increases to a predetermined degree over normal, which occurs, for example, when an undesirable accumulation of ice occurs in the chamber.

BACKGROUND OF THE INVENTION

It is a practice to chill water for various purposes by subjecting the water to the evaporator unit or coils of a cyclically operated refrigerating system, the temperature of which unit is normally maintained below freezing. The unit is generally located in a chamber through which the water is circulated by a pump, and the operation of the refrigerating system is controlled in response to sensing of a predetermined degree of ice accumulation on the freezing unit surface. This mode of control is not completely reliable and in many instances ice will accumulate on portions of the unit at least to a depth which is apt to rupture the walls of the chamber enclosing the unit, resulting in water damage to the machine and to objects in areas adjacent the machine.

Furthermore, when water fails to be circulated an appreciable volume through the chamber it is desirable to discontinue operation of the ice freezing system.

THE INVENTION

The present invention provides a new and improved safety control means for water chilling machines of the type mentioned which is responsive to shut down the refrigeration unit in response to either a pressure differential between the water stream entering and exiting the chamber containing the evaporator unit being a given degree below normal and also in response to an increase of the pressure differential above normal and for preventing the freezing operation of the evaporator unit.

Figure 1:
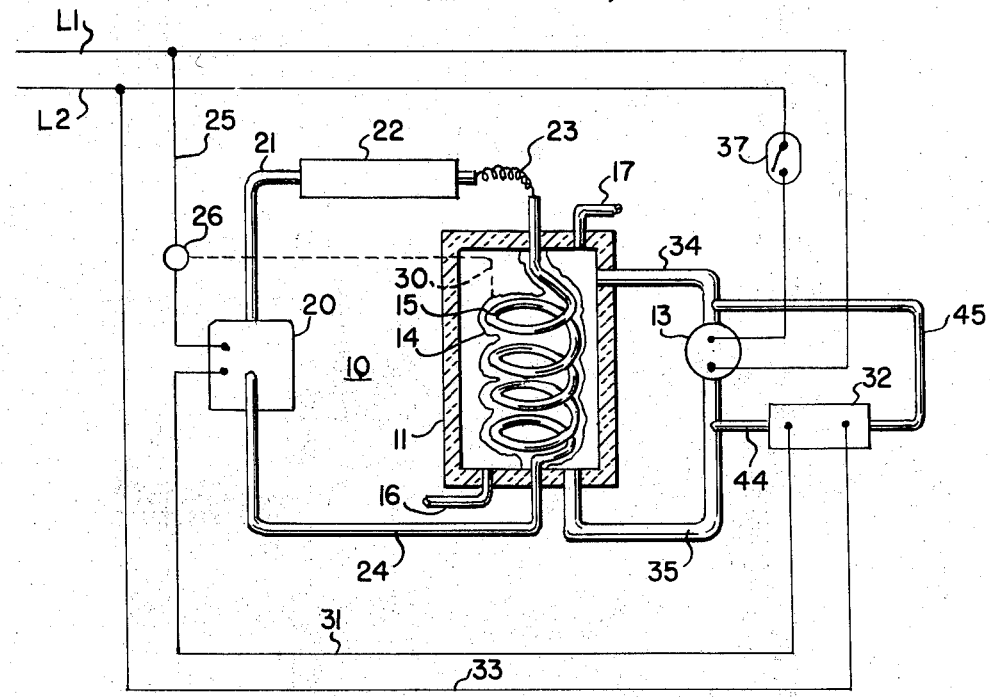
Figure 2:
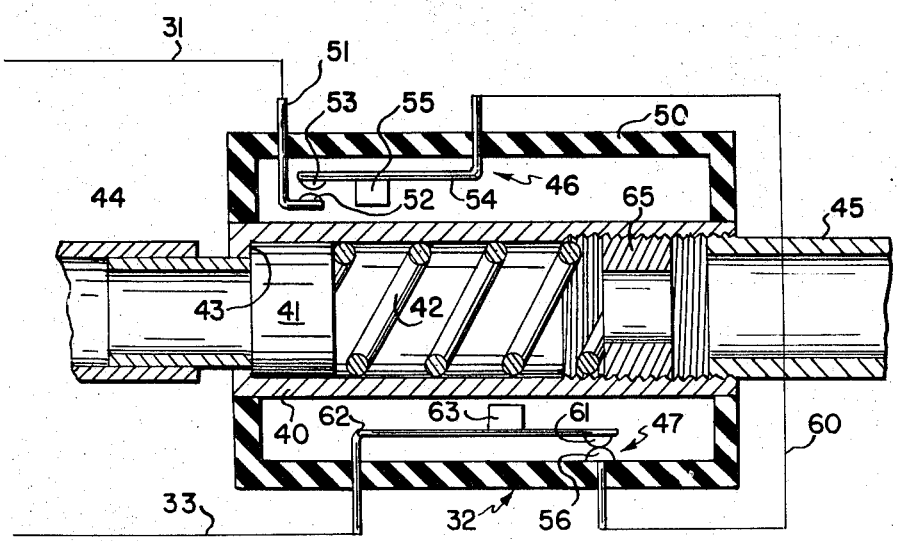

Other objects and advantages of the invention will be apparent from the following description of a preferred form of the invention, reference being made to the accompanying drawings wherein:

FIG. 1 is a schematic showing of a machine for chilling and carbonating water; and FIG. 2 is a schematic showing of a pressure differential control utilized in the system shown in FIG. 1.

Referring to the drawings, a water chilling and carbonating machine 10 is shown which includes a water chilling tank 11 in which the chilled water is charged with $CO_2$ gas. The temperature of the water in the tank is maintained at about 33° F. by circulating the water through the tank by a pump 13 so that the water passes along and over an ice bank 14 collected on the surfaces of coils 15 of the freezing unit of a mechanical refrigerating system.

The tank 11 is closed and is connected with a suitable water source such as a city water main, by an inlet 16. $CO_2$ gas is applied to the tank by suitable means, not shown, and the charged water is withdrawn from an outlet 17 for use at a soda dispensing faucet, for example, and which is not shown. It should be understood that any other suitable form of tank or container arrangement could be employed.

The evaporator coil 15 of the chilling unit is of the well known compressor-condenser-expander type refrigerating system which includes an electric motor-driven compressor 20 which discharges refrigerant through a conduit 21 into a condenser 22. Liquid refrigerant is directed from the condenser to the evaporator 15 through a capillary restrictor 23 and the evaporated refrigerant is withdrawn from the evaporator and returned to the compressor 20 through a tube 24.

One lead of the motor for the compressor 20 is connected with a power line L1 of a conventional power supply by a wire 25 in which a control device 26 is connected in series with the motor and which control device is normally operative to start and stop the compressor to maintain a given thickness or buildup of the ice 14 on the unit 15. Control devices of the type mentioned are well known and they usually include an ice sensing element spaced from the freezing surfaces of the unit 15 corresponding to the maximum thickness of ice desired to be maintained on the unit. In the present instance, the sensor is shown by the broken lines 30. The other lead of the compressor motor 20 is connected by a wire 31, safety control mechanism 32 and wire 33 to the second line L2 of the power source. The control mechanism 32 is responsive to the difference in pressures at the inlet and outlet of the pump 13 to control operation of the compressor 20, as is explained hereinafter.

The inlet of the water pump 13 is connected by a conduit 34 to the interior of the tank 11 at the upper end of the tank, and the discharge of the pump is connected by a conduit 35 to the interior of the tank at the lower end of the tank. Water is circulated by action of the pump from the bottom to the top of the tank 11 and passes in contact with the ice bank 14 on the coil 15 and is cooled to approximately 33° F. The pump 13 is driven by an electric motor, one terminal of which is connected to line L1 and the other terminal of which is connected with power line L2 through a suitable control switch 37, which is normally closed during operation of the machine 10.

The safety control mechanism 32 includes a cylindrical member 40 in which an iron piston 41 is adapted to move. The piston 41 is urged to the left-hand end of the cylinder by a coil spring 42 and rests against an annular shoulder 43 formed adjacent the left-hand end of the cylinder when at least a minimum pressure differential exists at opposite ends of the piston. When this pressure differential increases above a minimum value, the piston 41 moves against the spring 42 to the right, as viewed in FIG. 2, a distance proportional to the degree of the pressure differential. The left-hand end of the cylinder 40 is connected with the pump discharge conduit 35 by a tube 44 and the opposite end of the cylinder is connected with the pump intake conduit 34 by a tube 45. Thus, opposite ends of the piston are subjected to the pump discharge and intake pressures, respectively.

The safety control mechanism 32 includes two series circuit connected switches 46 and 47 which are supported in a housing 50 in which the member 40 is suitably mounted. The switch 46 includes a terminal 51, which is connected to wire 31, and has a fixed contact 52 which is adapted to be engaged by a movable contact 53 attached to the outer end of a flat contact spring arm 54, one end portion of which is embedded in a wall of the housing 50. The contact arm 54 is biased so as to normally urge the contact 53 away from the fixed contact 52. A permanent magnet 55 is attached to the arm 54 and is adapted to be attracted downwardly towards the piston 41 when the piston moves directly therebeneath, as viewed in FIG. 2, and cause contact 53 to engage contact 52 and close the switch 46.

The switch 47 includes a fixed contact 56 having a terminal portion attached to a wall of the housing 50 and the fixed contact is connected by a suitable conductor, shown schematically at 60, with the contact arm 54 of the switch 46. The contact 56 is adapted to be engaged by a movable contact 61 attached to the outer end of a flat spring type contact arm 62, one end of which is embedded in a wall of the housing 50 and connected with wire 33. The contact arm 62 is normally biased to cause contact 61 to engage contact 56 and close a circuit through the switch 47. A permanent magnet 63 is attached to the contact arm 62 and is adapted to be attracted upwardly by the piston 41 and open the contacts 56, 61 when the piston moves to a position above the magnet. The magnet 63 is located further to the right, as viewed in FIG. 2, than the magnet 55, and the piston 41 is positioned so as to not attract the magnet 63 to open the switch 47 until the piston is moved to a position somewhat to the right of that at which it initially attracts the magnet 55 to close the switch 46.

The differential in pressures at which the piston 41 is moved to close the switch 46 and open the switch 47 can be adjusted by a ring 65 which is threaded in the right-hand end of the cylinder 40 and against which one end of the spring 42 abuts so that the tension of the spring on the piston may be adjusted by rotating the ring in one direction or the other. The rate of the spring will determine the pressure differentials at which the piston 41 causes switches 46 and 47 to close and open, respectively.

It will be seen that whenever the water pressure differential between the inlet and outlet of the pump 13 falls below a predetermined minimum the circuit for the compressor 15 is opened by the switch 46, thus terminating operation of the refrigeration system. This condition may result from mechanical failure of the pump, loss of water or clogging of the water circulating system, for example. In the event the pressure differential between the outlet and inlet of the pump 13 increases to a degree indicating blockage of the flow of water through the tank 11, such as may be caused by failure of the control 26 to sense an abnormally heavy ice bank on the coils 15, the piston 41 causes opening of the switch 47 which shuts off operation of the refrigerating system. In the event the dimension of the ice bank 14 becomes such that it clogs the passage of water through the tank 11 and thus may rupture the tank if its buildup is not terminated, the refrigerating system is stopped by opening of switch 47 until the ice bank is reduced in size so as to permit relatively free flow of water through the tank. When this occurs the switch 47 and the refrigerating system will then cycle under the control of the switch 47, if the control 26 is defective.

It will be seen that a relatively inexpensive, and reliable safety control has been provided for a water chilling mechanism which assures safe and efficient operation of the unit as far as preventing rupture of the chilling chamber due to abnormal accumulation of ice on the freezing unit.

Although but one form of the invention has been shown and described it will be apparent that other forms, modifications and adaptations thereof may be made falling within the scope of the claims which follow.

I claim:

1. In a refrigerating system comprising a water chilling unit adapted to operate at subfreezing temperatures, means forming a water chamber about said unit, a pump having a water inlet and a water outlet connected with said chamber at spaced positions for circulating water through said chamber and in thermal exchange with said unit when said pump is operating, and control means for said chilling unit responsive to an increase in differential in pressure of the water at opposite sides of said pump for controlling the temperature of said unit.

2. In a refrigerating system as defined in claim 1 in which said control means is adapted to prevent operation of said chilling unit to freeze water when said pressure differential is below a predetermined minimum.

3. In a refrigerating system as defined in claim 2 in which said control means is adapted to prevent operation of said chilling unit to freeze water when said pressure differential is above a predetermined maximum.

4. A refrigerating system as defined in claim 3 further characterized by means for supplying water to said chamber and means for removing water from said chamber.

5. A refrigerating system as defined in claim 2 further characterized by means for supplying water to said chamber and means for removing water from said chamber.

6. In a refrigerating ssytem as defined in claim 1 in which said control means is adapted to prevent operation of said chilling unit to freeze water when said pressure differential is above a predetermined maximum.

7. A refrigerating system as defined in claim 6 further characterized by means for supplying water to said chamber and means for removing water from said chamber.

8. In a refrigerating system as defined in claim 1 in which said control means comprises a member movable from one position to another in response to an increase in said differential in pressure from a given minimum to a given maximum value, two electric switches, said movable member being operative to close one of said switches and open the other of said switches during said movement of said member.

References Cited

UNITED STATES PATENTS

| 1,712,567 | 5/1929 | Kritzer | 62—201 |
| 2,056,970 | 10/1936 | Leopold | 62—139 |
| 3,443,384 | 5/1969 | Knonick | 62—139 |

FOREIGN PATENTS

| 336,353 | 2/1936 | Italy | 62—139 |

MEYER PERLIN, Primary Examiner

U.S. Cl. X.R.

62—201, 394